Patented May 24, 1938

2,118,432

UNITED STATES PATENT OFFICE 2,118,432

COLORING MEDIUM

Albert E. Gessler, New York, N. Y., assignor to Interchemical Corporation, New York, N. Y., a corporation of Ohio No Drawing. Original application January 14, 1935, Serial No. 1,605. Divided and this application September 10, 1937, Serial No. 163,243

5 Claims. (Cl. 8—76)

This application contains subject matter divided from my co-pending application, Serial No. 1,605, filed January 14, 1935.

The present invention relates to a coloring medium and a method of making the same. It is of especial value for textile printing.

The invention is based on the discovery that a superior and economical coloring composition can be produced by separately dissolving in certain water-miscible, organic solvents a dye and a lake-forming precipitant therefor, preferably in separate portions of solvent which are later mixed. Preferably, the solvent is thickened by incorporating or dissolving therein a colloid, such as nitro-cellulose. Compositions according to the invention are particularly adapted to printing textile materials. Following the printing operation, the printed material may be treated with water, which immediately precipitates the lake on the fibres of the material, without the need for elaborate after-treatments. Instead of precipitating the coloring material by means of water, the printed material may be heated to evaporate the solvent.

The resulting prints are light-fast and possess exceptional brilliance, although the coloring composition contains only a few per cent. of colored substance. Without restricting the invention to any particular theory of operation, I believe that these improved results are due to the extremely fine state of sub-division of the colored particles which are precipitated from the solution. The present composition is distinguished from compositions in which a pre-formed lake is added to an organic solvent by being a clear solution in contrast to suspensions of pigment particles.

Coloring compositions according to the invention may be prepared by dissolving a basic dye and a heteropoly mineral acid, which is a precipitant for the dye, in an ethylene glycol ether. Basic dyes are the most desirable because of their strong coloring power. As the precipitant or lake-forming reagent for such dyes, I prefer to employ phospho-tungstic acid, although other similar heteropoly mineral acids or their salts, such as sodium phospho-tungstate, phospho-molybdic acid, or silico-tungstic acid may be used. I have found that excellent results are obtainable by employing as the solvent monoethyl ether of diethylene glycol or mono-butyl ether of diethylene glycol. However, the similar ethylene glycol ethers, commonly known as Cellosolves, may be used. Before adding one or both of the lake-forming ingredients to the solvent, it is advantageous to incorporate in the solvent a thickener, which is preferably also soluble in the solvent. Such a thickener appears to assist in preventing discrete particles of lake from settling out of solution. When the composition is to be set by diluting it with water, following the printing operation, the thickener is advantageously insoluble in water. I have found the cellulose esters and ethers most desirable for this purpose, although those skilled in the art will be able to select other suitable colloids or thickeners. The thickener assists in preventing spreading of the composition in the material to be colored, and in many cases also serves to bind the pigment to the fibers of the textile material. When the composition is to be set by water, and there is no objection to washing out some of the thickener, or when the composition is dried by heat, a water-soluble thickener, for instance methyl cellulose, may be employed.

By way of a specific example in accordance with the invention, I set forth the following:

Example 1

|  |  | Parts |
|---|---|---|
| Dye: | Rhodamine 6G (Schultz #571) | 10 |
| Precipitant: | Duo deci phospho-tungstic acid | 25 |
| Thickener: | Nitrocellulose (1000 seconds viscosity) | 60 |
| Solvent: | Moisture-free diethylene-glycol-monoethyl-ether | 1000 |

This composition, made by dissolving the dye and precipitant in separate portions of the thickened solvent and then mixing, is a colored solution, particularly adapted for application to fabrics. After the composition has been applied, for instance by printing or stenciling, the fabric may be wetted with water. This results in precipitating a fine, impalpable pigment on the surface and in the fibres of the fabric. The thickener (which in this case is a binder for the lake) is also precipitated. If desired, the color may be set by heating the material to evaporate the solvent, in which case the solvent need not be water-miscible.

Example 2

|  |  | Parts |
|---|---|---|
| Dye: | Rhodamine 6G (Schultz #571) | 3 |
| Precipitant: | Duo deci phospho-tungstic acid | 9 |
| Thickener: | Nitrocellulose (½ second) | 30 |
| Solvent: | { 1 diethylene-glycol-mono-ethyl-ether<br>3 diethylene-glycol-mono-butyl-ether } | 45 |

This composition has substantially the consistency of ordinary oil-varnish printing ink.

It will be understood that many other dyes can be readily selected from the available color index tables, for solution in the solvent and reaction with the precipitant to form a light-fast lake. As indicated above, while the monoethyl- and mono-butyl ethers of diethylene glycol are particularly advantageous, aliphatic ethers of ethylene glycol are satisfactory for some purposes. The solvents which I prefer to employ for both the dye and the precipitant, are apparently also solvents for the lake. It will be understood that a mixture of solvents falls within the spirit of the invention. The solvents employed are free from water or practically so.

The terms and expressions which have been employed are used as terms of description and not of limitation, and there is no intention, in the use of such terms and expressions, of excluding any equivalents of the features shown and described, or portions thereof, but it is recognized that various modifications are possible within the scope of the invention claimed.

What I claim is:

1. A coloring composition composed essentially of a solution of a basic dye and a lake-forming precipitant therefor in an ether of a glycol.

2. A coloring composition composed essentially of a solution of a basic dye, a lake-forming precipitant therefor and a thickener in an ether of an ethylene glycol.

3. A coloring composition composed essentially of a solution of a basic dye and a lake-forming heteropoly mineral acid in a mono-aliphatic ether of diethylene glycol.

4. A coloring composition comprising a solution of a basic dye, a heteropoly mineral acid and a binder in substantially water-free monoethyl ether of diethylene glycol.

5. A coloring composition comprising a solution of a basic dye, a heteropoly mineral acid and a binder in substantially water-free monobutyl ether of diethylene glycol.

ALBERT E. GESSLER.